US008432455B2

(12) United States Patent
Tang et al.

(10) Patent No.: US 8,432,455 B2
(45) Date of Patent: Apr. 30, 2013

(54) METHOD, APPARATUS AND COMPUTER PROGRAM PRODUCT FOR AUTOMATICALLY TAKING PHOTOS OF ONESELF

(75) Inventors: Yuezhong Tang, Beijing (CN); Hao Wang, Beijing (CN); Huanglingzi Liu, Beijing (CN)

(73) Assignee: Nokia Corporation

( * ) Notice: Subject to any disclaimer, the term of this patent is extended or adjusted under 35 U.S.C. 154(b) by 520 days.

(21) Appl. No.: 12/347,460

(22) Filed: Dec. 31, 2008

(65) Prior Publication Data

US 2010/0165119 A1 Jul. 1, 2010

(51) Int. Cl.
*H04N 5/232* (2006.01)

(52) U.S. Cl.
USPC ................................. 348/211.99; 348/222.1

(58) Field of Classification Search .... 348/14.01–14.16, 348/207.99, 222.1, 231.99, 231.2, 240.1, 348/333.07, 211.99; 396/2; 382/115
See application file for complete search history.

(56) References Cited

U.S. PATENT DOCUMENTS

| 4,389,109 | A | 6/1983 | Taniguchi et al. |
| 4,951,079 | A | 8/1990 | Hoshino et al. |
| 2002/0101512 | A1* | 8/2002 | Klapman et al. ............... 348/207 |
| 2003/0113109 | A1 | 6/2003 | Pelletier |
| 2004/0105672 | A1* | 6/2004 | Misumi et al. ..................... 396/2 |
| 2004/0201720 | A1* | 10/2004 | Robins et al. ............. 348/222.1 |
| 2004/0234108 | A1 | 11/2004 | Li et al. |
| 2005/0122416 | A1* | 6/2005 | Ryu et al. ................. 348/333.07 |
| 2006/0082655 | A1* | 4/2006 | Vanderwilt et al. ...... 348/207.99 |
| 2006/0104483 | A1 | 5/2006 | Harel et al. |
| 2006/0158522 | A1* | 7/2006 | Pryor ........................ 348/207.99 |
| 2006/0222214 | A1* | 10/2006 | Kaneda et al. ................ 382/115 |
| 2007/0269203 | A1 | 11/2007 | Awazu |
| 2008/0079824 | A1* | 4/2008 | Sawachi ..................... 348/240.1 |
| 2008/0192129 | A1* | 8/2008 | Walker et al. .............. 348/231.2 |
| 2008/0246852 | A1* | 10/2008 | Mori .......................... 348/222.1 |
| 2008/0273097 | A1* | 11/2008 | Nagashima .............. 348/231.99 |
| 2009/0059027 | A1* | 3/2009 | Iwamoto .................... 348/222.1 |
| 2009/0162043 | A1 | 6/2009 | Chou |
| 2009/0244323 | A1 | 10/2009 | Carter et al. |

FOREIGN PATENT DOCUMENTS

| CN | 1933553 | 3/2007 |
| EP | 0376618 A2 | 12/1989 |
| EP | 2026248 A2 | 2/2009 |

OTHER PUBLICATIONS

International Search Report and Written Opinion for Application No. PCT/IB2009/007767 mailed Apr. 9, 2010.

(Continued)

*Primary Examiner* — Nelson D. Hernández Hernández
*Assistant Examiner* — Dennis Hogue
(74) *Attorney, Agent, or Firm* — Alston & Bird LLP (57) ABSTRACT

A method for capturing an image may include receiving a start command, determining whether one or more predefined conditions are satisfied, and capturing an image when the predefined conditions are satisfied. The start command and/or the predefined conditions may be dependent on an audible signal. The predefined conditions may include predetermined reception angles of the audible signal, ratios of foreground to background, and/or reception of a remote control signal. The method may also require that no visual feature is occluded. Individualized feedback may be provided which can direct a specific person within an image to correct a failed predefined condition. An apparatus and computer program product corresponding to the method are also provided.

20 Claims, 3 Drawing Sheets

OTHER PUBLICATIONS

FotoNation FaceTime™ Demonstrated at PMA 2008, FotoNation Announces FaceTime™ Technology for Digital Cameras & Camera Phones; http://www.fotonation.com/index.php?module=press-release&item=197 cite visited Dec. 23, 2008 (2 pgs.).

FotoNation Revolutionizes the Self-Timer, FotoNation Announces "FaceTime™" Technology for Digital Cameras & Camera Phones; http://www.dpreview.com/news/0801/08011504facetime.asp cite visited Dec. 23, 2008 (2 pgs.).

FotoNation BlinkCheck , FotoNation BlinkCheck is an Extension Module to its FaceTracker™ Face Detection and Tracking Technology; http://www.fotonation.com/index.php?module=product&item=214 cite visited Dec. 23, 2008 (2 pgs.).

FotoNation SmileCheck, FotoNation Smile Check™ is an Extension Module to its FaceTracker™ Face Detection and Tracking Technology; http://www.fotonation.com/index.php?module=product&item=204 Cite visited Dec. 23, 2008 (2 pgs.).

Fujifilm FinePix Z200fd 10 MP Digital Camera with 5x Optical Dual Image Stabilized Zoom: Features, Reviews; http://astore.amazon.com/fujifilm.finepix.z200fd-20/detail/B001D0G57S cite visited Dec. 23, 2008 (6 pgs.).

Shutter Voice—Voice control Camera Software http://www.shuttervoice.com/default.asp cited visited Dec. 23, 2008 (3 pgs.).

Extended Search Report for European Application No. 09 836 142.1 dated May 3, 2012.

* cited by examiner

METHOD, APPARATUS AND COMPUTER PROGRAM PRODUCT FOR AUTOMATICALLY TAKING PHOTOS OF ONESELF

TECHNOLOGICAL FIELD

Embodiments of the present invention relate generally to image capturing technology and, more particularly, relate to a method, apparatus and computer program product for automatically taking photos of oneself.

BACKGROUND

Technologies for automatically taking photos are emerging to improve the quality of photos and make taking photos easier. Mobile terminals with this type of technology can support detection of a person's face, brightness, distance and motion of the subjects, as well as optical image stabilization, auto focus, auto exposure, auto white balance, or combinations thereof. These technologies increase the odds that an acceptable photographic image will be captured.

However, these technologies only partially address the needs of persons taking photographs. In particular, it is still difficult to capture high quality photos of oneself. In this regard, many mobile terminals provide a self timer, which delays the shutter release by a predefined period of time before capturing the image. This allows the photographer to initiate an image capture sequence, and then position himself in front of the camera of the mobile terminal before the image is taken. This approach often results in limited success because the photographer is unable to provide guidance to other people appearing within the photograph. Further, the photographer cannot be assured that the image that will be captured will appear as desired. The same situation exists when the photographer is unable to fully communicate with the persons being photographed and hence is unable to fully provide instructions to the persons being photographed. In particular, this can be the case when the photographer speaks a different language than the persons being photographed.

Accordingly, there exists a need for additional technologies which will improve the rate of success of photographs taken, particularly when the photographs are taken without a person holding the camera and when the person holding the camera is unable to fully communicate with the persons being photographed.

BRIEF SUMMARY OF SOME EXAMPLES

A method, apparatus and computer program product are therefore provided to automatically capture images. For example, embodiments of the present invention facilitate taking pictures of oneself, either in an unaided and automated fashion of without requiring meaningful feedback from the person taking the picture.

In some exemplary embodiments, an apparatus is provided that includes a processor configured to receive a start command, determine whether one or more predefined conditions are satisfied, and capture an image when the one or more predefined conditions are satisfied. In these embodiments, at least one of the start command or one or more of the predefined conditions is dependent upon an audible signal. The processor may further be configured to determine that an audible directional condition is satisfied when a reception angle of the audible signal falls within a predefined range of angles. Additionally, the processor may be configured to transmit a directional feedback signal indicating a relative directional movement which will cause the reception angle of a subsequent audible signal to fall within the predefined range of angles. The processor may also be configured to recognize one or more characters of text, which may serve as a predefined condition for the capture of an image. Further, the processor may be configured to recognize one or more background features. The processor may additionally be configured to determine whether a ratio relating a foreground portion to a background portion falls within a predefined range of foreground to background ratios. Also, the processor may be configured to transmit a representation of the image to a remote controller which, in turn, displays the representation of the image.

Moreover, the processor may be configured to search a database for one or more photographic images corresponding to one or more faces of one or more individuals located within the image when one or more of the predefined conditions are not satisfied. The processor of this embodiment may determine one or more names corresponding to the one or more photographic images, and transmit an audible feedback signal regarding one more of the predefined conditions that are not satisfied. The audible feedback signal may include the one or more names. Furthermore, the processor may be configured to determine which of the one or more individuals situated within the image should make a change that would satisfy the one or more predefined conditions which are not satisfied. The processor of this embodiment may identify the one or more individuals that should make the change by the one or more names in the database or by a relative position to the individuals with the one or more names in the database. Finally, the processor may be configured to determine whether one or more recognized visual features in the image are occluded.

In another exemplary embodiment, a method for automatically capturing an image is provided. This method may include receiving a start command, determining whether one or more predefined conditions are satisfied, and capturing an image when the one or more predefined conditions are satisfied. In this embodiment, at least one of the start command or one or more of the predefined conditions is dependent upon an audible signal. The method may further include determining whether a reception angle of the audible signal falls within a predefined range of angles. The method may additionally include transmitting a directional feedback signal indicating a relative directional movement which will cause the reception angle of a subsequent audible signal to fall within the predefined range of angles. The method may also include determining whether a ratio relating a foreground portion to a background portion falls within a predefined range of foreground to background ratios. Finally, the method may include transmitting a representation of the image to a remote controller which, in turn, displays the representation of the image.

In another exemplary embodiment, a computer program product for automatically capturing an image comprising at least one computer-readable storage medium having computer-executable program instructions stored therein is provided. The computer-executable program instructions may include a program instruction configured to receive a start command, a program instruction configured to determine whether one or more predefined conditions are satisfied, and a program instruction configured to capture an image when the one or more predefined conditions are satisfied. In this embodiment, at least one of the start command or one or more of the predefined conditions is dependent upon an audible signal. The computer-executable program instructions may further include program instructions configured to determine whether a reception angle of the audible signal falls within a predefined range of angles. The computer-executable program instructions may additionally include program instructions configured to transmit a directional feedback signal indicating a relative directional movement which will cause the reception angle of a subsequent audible signal to fall within the predefined range of angles. The computer-executable program instructions may also include program instructions configured to determine whether a ratio relating a foreground portion to a background portion falls within a predefined range of foreground to background ratios. Finally, the computer-executable program instructions may also include program instructions configured to transmit a representation of the image to a remote controller which, in turn, displays the representation of the image.

Embodiments of the invention may provide a method, apparatus and computer program product for employment, for example, in mobile or fixed environments. As a result, for example, mobile terminal users may enjoy automated capture of images.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS OF THE INVENTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Embodiments of the present invention provide an apparatus, method, and computer program product by which improvements may be experienced in relation to capturing photographic images, particularly when capturing images of oneself. These improvements may be equally applicable to other situations including where the person taking the picture is unable to fully communicate with the persons being photographed. However, embodiments of the invention may at times be described in terms of self photography for the sake of brevity.

Figure 1:
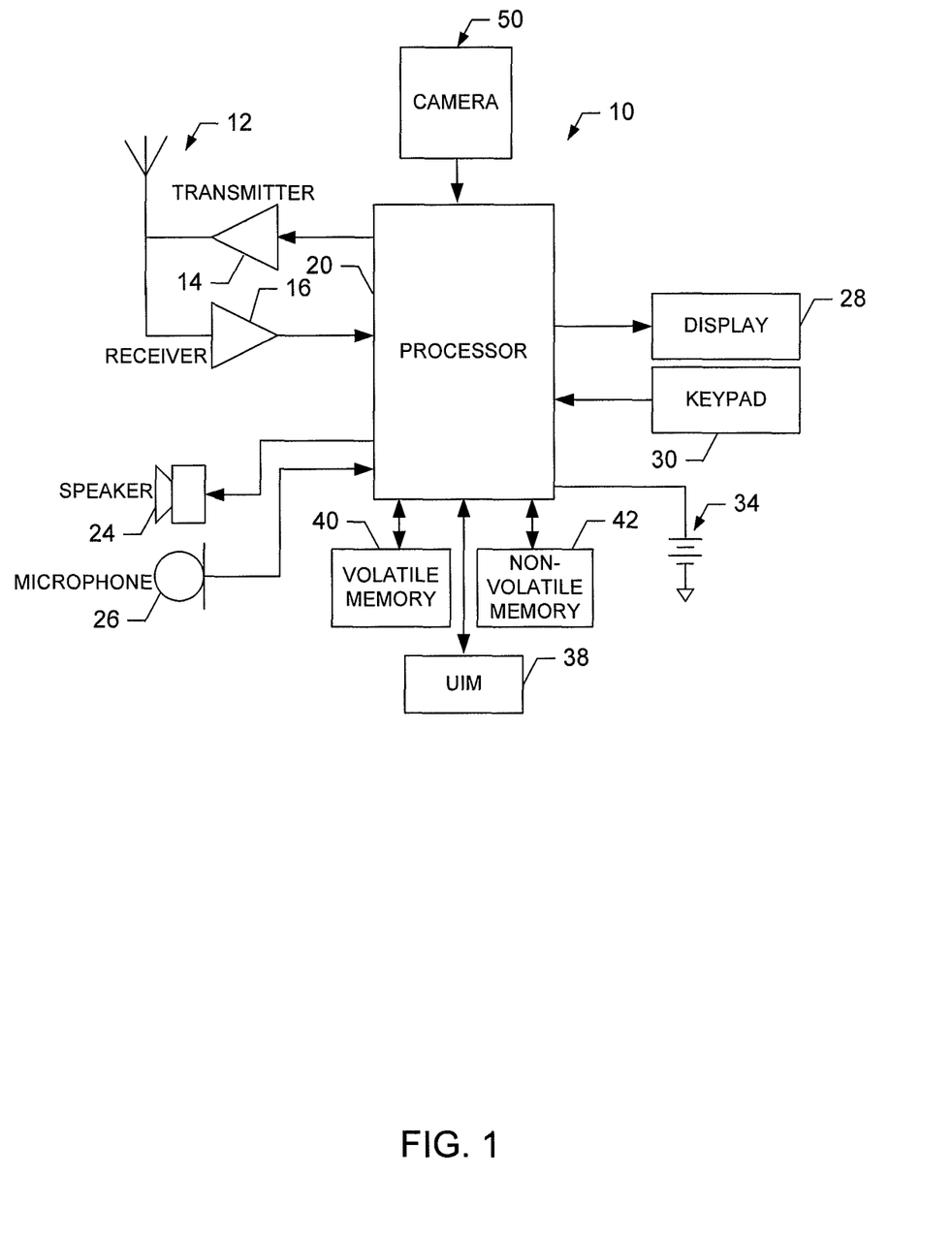
FIG. 1 illustrates one example of a schematic block diagram of an apparatus for enabling automated image capturing according to an exemplary embodiment of the present invention.

FIG. 1 illustrates a block diagram of a mobile terminal 10 that may benefit from embodiments of the present invention. It should be understood, however, that a mobile terminal 10 as illustrated and hereinafter described is merely illustrative of one type of device that may benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, laptop computers, cameras, video recorders, global positioning system (GPS) devices, mobile telephones, any combination of the aforementioned, and/or other types of voice and text communications systems, can readily employ embodiments of the present invention so long as they can capture images. Furthermore, devices that are not mobile may also readily employ embodiments of the present invention.

In addition, while several embodiments of the method of the present invention are performed or used by a mobile terminal 10, the method may be employed by devices other than a mobile terminal. In particular, other devices having image capturing capabilities can function in accordance with embodiments of the present invention, regardless of its ability to communicate, either wirelessly or via a wired connection. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 of the illustrated embodiment includes an antenna 12 (or multiple antennas) in operable communication with a transmitter 14 and a receiver 16. The mobile terminal 10 may further include an apparatus, such as a processor 20 or other processing element, that may in part provide signals to and receive signals from the transmitter 14 and receiver 16, respectively. The signals may include signaling information in accordance with the air interface standard of the applicable cellular system, and/or may also include data corresponding to speech, received data and/or user generated/transmitted data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks. As noted above, some embodiments of the invention do not necessitate communication capabilities, let alone wireless communications, at all.

The processor 20 may include circuitry implementing, among others, audio, image, and logic functions of the mobile terminal 10. For example, the processor 20 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 20 may be configured to execute instructions stored in memory 40, 42 or otherwise accessible to the processor 20. As such, whether configured by hardware or software methods, or by a combination thereof, the processor 20 may represent an entity capable of performing operations according to embodiments of the present invention while configured accordingly.

The mobile terminal 10 may also comprise a user interface including an output device such as an earphone or speaker 24, a microphone or array of microphones 26, a display 28, and a user input interface, which may be operationally coupled to the processor 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and other hard and soft keys used for operating the mobile terminal 10. Alternatively, the keypad 30 may include a QWERTY keypad arrangement. The keypad 30 may also include various soft keys with associated functions. In addition, or alternatively, the mobile terminal 10 may include an interface device such as a joystick or other user input interface such as a selection dial. The mobile terminal 10 may further include a battery 34, such as a vibrating battery pack, for powering various circuits that are used to operate the mobile terminal 10, as well as optionally providing mechanical vibration as a detectable output.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. In addition to the UIM 38, the mobile terminal 10 may be equipped with memory 40, 42 as described above. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 can additionally or alternatively comprise an electrically erasable programmable read only memory (EEPROM), flash memory, other non-volatile RAM (NVRAM) or the like. Non-volatile memory 42 may also include a cache area for the temporary storage of data. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the processor 20, which determines an identity of the current cell, i.e., cell id identity or cell id information, with which the mobile terminal 10 is in communication. The non-volatile memory 42 may further store captured photographic images.

The mobile terminal 10 of the illustrated embodiment further includes a camera 50, or other device for capturing images. The camera 50 may be configured to capture an image and to store or to provide for storing the image. The image may be stored in a digital form, for example, in the non-volatile memory 42, or may alternatively be stored on film. Many types of cameras 50 may be used, but cameras having higher resolution capabilities are advantageous because of their ability to identify smaller details of a scene being captured. This identification of smaller details enables the mobile terminal 10 to better implement its functionality, which will now be described in operation, although a camera having lower resolution may still employ embodiments of the present invention.

Figure 2:
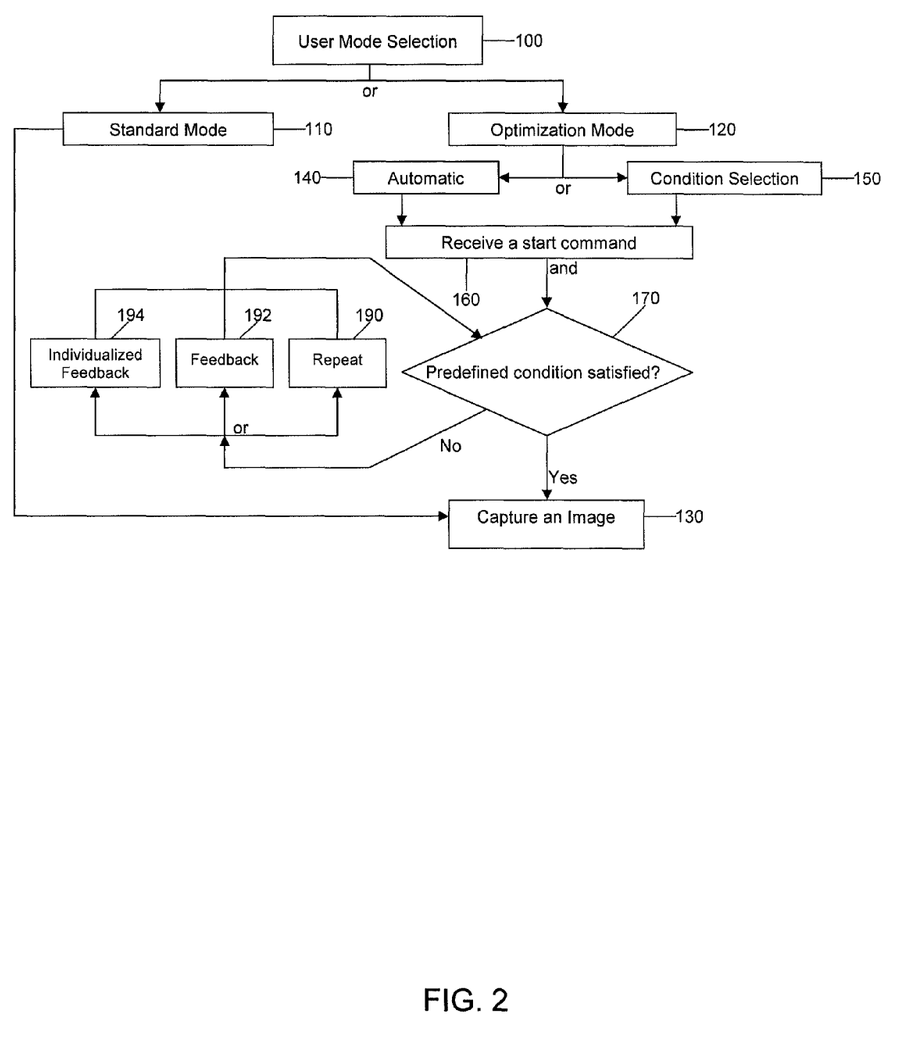
FIG. 2 shows a flowchart according to an exemplary method for providing automated image capturing according to an exemplary embodiment of the present invention.

Referring to FIG. 2, there is shown a flowchart of a system, method and program product according to exemplary embodiments of the invention. As shown, a user may control a mode selection, as shown in operation 100, which allows the user to select either a standard mode of operation 110 of the camera 50, or another mode, termed an optimization mode of operation 120 herein. If the user selects the standard mode of operation 110, there may still be certain requirements that must be met before capturing an image, as shown in operation 130, such as bringing the image into focus or having enough light, but this mode may be substantially less complex than the optimization mode, as shown in operation 120. However, if the user selects the optimization mode, as shown in operation 120, the user may be presented with the option of choosing an automatic optimization mode, as shown in operation 140, or a condition selection mode, as shown in operation 150. Under the condition selection mode, as shown in operation 150, the operator of the camera may select precisely the desired conditions required before the mobile terminal 10 captures an image, as shown in operation 130. Alternatively, under the automatic mode, as shown in operation 140, the conditions may be set in a predefined manner designed to provide positive image results. Regardless of whether the user selects the standard mode of operation 110 or the optimization mode of operation 120, the camera 50 will focus on at least a portion of the image.

Regardless of whether the automatic optimization mode, as shown in operation 140, or condition selection optimization mode, as shown in operation 150, is selected, the mobile terminal 10 of one embodiment is configured to receive a start command, as shown in operation 160, and determine whether predefined conditions are satisfied, as shown in operation 170. In addition to determining whether the one or more predefined conditions are satisfied, the mobile terminal of one embodiment is configured to focus on at least a portion of an image in response to the start command. Further, as will be described below, the start command, the predefined conditions, or both may be dependent on an audible signal. The audible signal may be received, for example, by the microphones 26 on the mobile terminal 10. If a start command is received, as shown in operation 160, and the predefined conditions are satisfied, as shown in operation 170, and, in one embodiment, sufficient focus may be obtained, then an image may be captured, as shown in operation 130, by the camera 50 of the mobile terminal.

With regard to the audible signal, it can comprise a variety of different forms. In embodiments in which the start command is dependent on an audible signal, the start command may take the form of an audible signal originating from an operator of the mobile terminal 10. For instance, the operator could say, "start now," which when received by the microphones 26 and recognized, such as by speech recognition, by the processor of the mobile terminal 10, would instruct the processor to then determine whether the predefined conditions are satisfied, as shown in operation 170. Various predetermined conditions may be defined, as described below. When the predefined conditions are dependent on an audible signal, for example, the mobile terminal 10 may not capture an image, as shown in operation 130, until an audible signal is received. For instance, the users may be required to say "cheese" as one of the predefined conditions with the microphone configured to capture the spoken word and the processor configured to recognize the spoken word as "cheese" in satisfaction of the predefined condition. Further, the audible signal could be required to originate from a certain individual with the processor configured to recognize the speaker, using, for example, known voice recognition technology. Thus, for instance, the mobile terminal 10 may be prevented from prematurely capturing an image, as shown in operation 130, when a nearby person unrelated to the current photographic process says "cheese."

Other predefined conditions may be employed. One such predefined condition may be of an audible directional condition. In one embodiment, this predefined condition will only be satisfied when a reception angle of an audible signal falls within a predefined range of angles. For instance, the mobile terminal 10 could be configured with an array of microphones 26 to permit the determination, such as by triangulation, of the direction from which the start command originated. If the start command, or other audible signal, is too far off center from the mobile terminal 10 so as to be outside the predefined range of angles, the predefined condition will not be satisfied. The processor of this embodiment may could be further configured to determine the relative movement that must be taken to cause the audible directional condition to be satisfied and to provide a directional feedback signal indicating a relative directional movement between the mobile terminal 10 and the speaking individual which will cause the reception angle of a subsequent audible signal to fall within the predefined range of angles. For example, the processor may determine, through triangulation, that the audible signal was too far to the right and, as such, may provide an audible signal indicating that the speaker should move to the left and then repeat the audible signal. Thus, if the first audible signal fails the predefined audible directional condition, the subsequent audible signal will have a better chance of satisfying the audible directional condition, because the directional feedback will indicate which way to move the mobile terminal 10 or which way the person giving the audible signal should move.

Another predefined condition may be the requirement that the mobile terminal 10 recognize one or more characters of text. For instance, when a user wants the mobile terminal 10 to recognize the text on a sign he is standing beside, the user might select the text recognition predefined condition such as via the selection of the text recognition predefined condition from among a plurality of optional predefined conditions presented to the user via the display 28. The mobile terminal may then wait to capture an image, as shown in operation 130, until the processor confirms that the text is recognized such as via a text recognition process. This condition could, for instance, allow the mobile terminal 10 to ensure that the text is brought into focus prior to capturing the image. Recognition of characters of text can occur through use of various optical character recognition (OCR) techniques.

A further predefined condition may be recognition of one or more background features. For instance, the mobile terminal 10 could store in its memory, such as non-volatile memory 42, images from a variety of famous landmarks such as the Eiffel Tower or the Washington Monument. If the mobile terminal 10 is set in this mode, the processor could wait until a predetermined background feature is recognized and optionally additionally, brought into focus, before capturing the image, as shown in operation 130.

An additional predefined condition may be a requirement that a ratio of a foreground portion to a background portion of an image fall within a predefined range of foreground to background ratios. For instance, when taking a picture of a person with a sunset in the background, the mobile terminal 10, such as the processor, could be configured to wait to capture an image, as shown in operation 130, until the person occupying the foreground occupies a certain ratio of the image as compared to the sunset in the background. This would allow the mobile terminal 10 to effectively "balance" the background and foreground appearing in a captured image according to predefined ratios.

Figure 3:
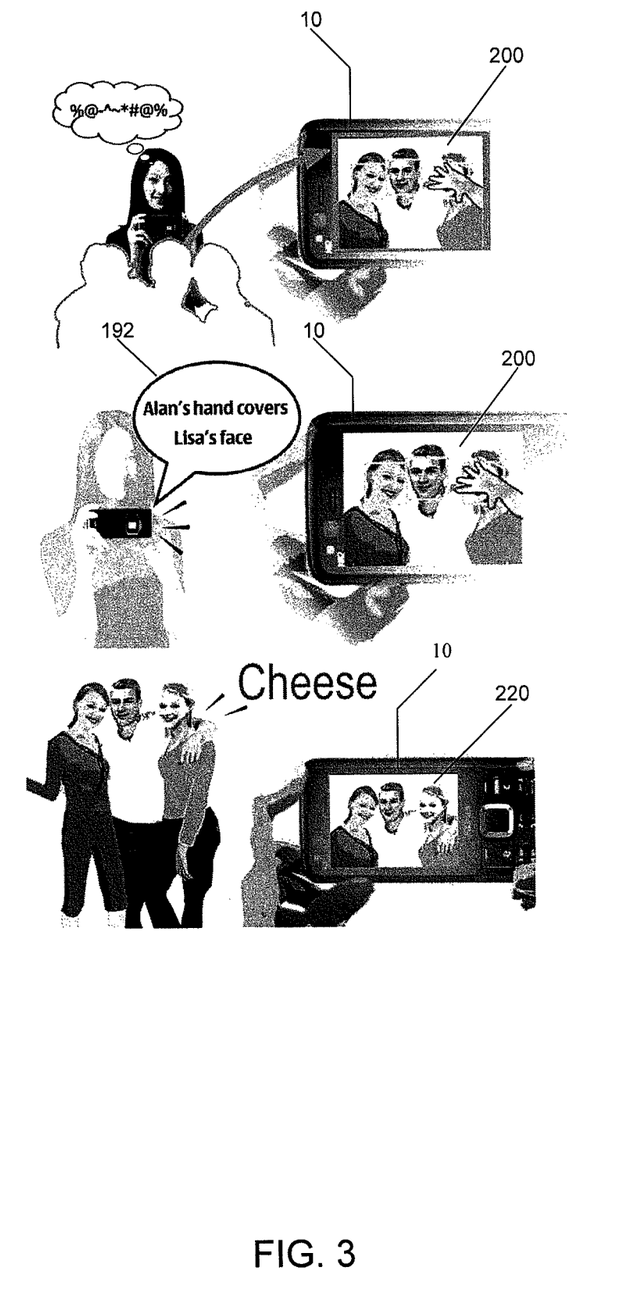
FIG. 3 describes an attempted capture of an image wherein a predefined condition is found to be unsatisfactory, but then is later corrected, based on individualized feedback so as to allow for the capture of an image according to an exemplary embodiment of the present invention.

A further additional predefined condition may be a requirement that no recognized visual feature within the image be occluded. For example, as shown in FIG. 3, the processor of the mobile terminal 10 would not find this condition to be satisfied in the initial pose 200 viewed by the camera 50 where a person's face is blocked by another person's hand. The mobile terminal 10 could either simply refuse to take a photo until the occlusion has been removed, or it could, for example, provide individualized feedback, as shown in operation 194, as will be described later, with respect to how to correct the unsatisfied condition. Once the occlusion has been removed and a new pose 220 is viewed be the camera 50, the mobile terminal 10 may capture an image, as shown in operation 130.

Another predefined condition may be a requirement that a remote controller provide an input necessary for the mobile terminal 10 to capture an image, as shown in operation 130. This requirement could, for instance, allow a person appearing within the image to wait and capture an image, as shown in operation 130 only when he is ready. This remote controller of one embodiment could comprise an apparatus substantially identical to the mobile terminal 10, and hence it will not be shown separately. The remote controller could then communicate with the mobile terminal 10 and receive and display a representation of the image which would appear if the mobile terminal were to capture an image, as shown in operation 130, at that moment. This provides a person with the ability to preview a picture before it is captured even if the person is himself appearing in front of the camera 50 on the mobile terminal 10. If the image appears satisfactory, the user may respond, such as by selecting the "enter" key. This response may then be transmitted to the mobile terminal to trigger the camera 50 to capture the image. Alternatively, if the previewed image is unsatisfactory, the user may attempt to reconfigure the scene prior to receiving another image to preview from the mobile terminal.

Other potential predefined conditions that could be optionally employed by the mobile terminal include facial recognition which could require focusing upon each face, facial expression recognition which could require each person to smile, and/or pose recognition which could require that the head and shoulders of each person appear in the image.

With respect to all of the predefined conditions, the mobile terminal 10 may respond in several different ways when a predefined condition is not satisfied, as shown in operation 170 of FIG. 2. One potential response would be simply to not capture an image, as shown in operation 130. However, several other options may be more constructive. One such option is to repeat, as shown in operation 190, the step of checking as to whether the predefined conditions are satisfied, as shown in operation 170. This repetition would allow the operator of the mobile terminal 10 or the persons appearing in the view of the camera 50 the opportunity to correct any problems that previously resulted in a failed predefined condition.

Alternatively, the mobile terminal 10, such as the processor, may provide feedback, as shown in operation 192, which could assist the person operating the mobile terminal 10 or the persons appearing in the range of the camera 50 in correcting the deficiencies which are resulting in the predefined conditions failing to be satisfied, as shown in operation 170. A third option is to provide individualized feedback, as shown in operation 192, which further attempts to address a particular person appearing within the view of the camera 50 by audibly pronouncing the person's name and then providing a suggestion aimed at curing the prior failure.

In this embodiment, the mobile terminal 10, such as the processor, may view a current image and then search a stored database of pictures, which could reside in memory, such as the non-volatile memory 42, for a matching face to that appearing in the image using facial recognition technology. For example, a contacts database may include images of at least some of its members and may serve as a point of reference during a facial recognition search. If an individual within the current image is recognized from an image within the database, the processor may determine the corresponding name within the internal database. Alternatively, the mobile terminal 10 could search an external database, such as one for a social networking site and, if a match is discovered, determine the corresponding name within the external database. The mobile terminal 10 may communicate with the external database using either a wireless or wired network connector. An example of individualized feedback, as shown in operation 194, after determining the name of an individual is shown in FIG. 3. In this example, Alan's hand is occluding Lisa's face, a recognized visual feature, and thus the mobile terminal 10 could audibly announce, "Alan's hand covers Lisa's face." The mobile terminal 10, such as the processor, could use known text-to-speech technologies to pronounce each name found in a database. The individualized feedback 194 could also be based on relative position to a person of a known name, if the person who should make a change to satisfy a predefined condition, as shown in operation 170, does not have a name which can be found. For instance, in FIG. 3, if Alan's name could not be found in a database, the mobile terminal 10 could alternatively announce, "The hand of the person beside Lisa covers Lisa's face." The mobile terminal 10 may further attempt to determine an easiest solution to the failure of a predefined condition. For instance, in FIG. 3, it would be easier for Alan to move his hand, as opposed to Lisa moving her head. Accordingly, the mobile terminal 10 could specifically direct Alan to move his hand.

As described above, FIG. 2 is a flowchart of a system, method and program product according to exemplary embodiments of the invention. It will be understood that each block or step of the flowchart, and combinations of blocks in the flowchart, may be implemented by various means, such as hardware, firmware, and/or software including one or more computer program instructions. For example, one or more of the procedures described below may be embodied by computer program instructions. In this regard, the computer program instructions which embody the procedures described above may be stored by a memory device of the mobile terminal 10 (or other image capturing apparatus) and executed by a processor in the mobile terminal (e.g., the processor 20 or other image capturing apparatus). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart may support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

In an exemplary embodiment, an apparatus for performing the method of FIG. 2 described above may comprise a processor (e.g., the processor 20) configured to perform some or each of the operations (100-194) described above. The processor may, for example, be configured to perform the operations (100-194) by performing hardware implemented logical functions, executing stored instructions, or executing algorithms for performing each of the operations. Alternatively, the apparatus may comprise means for performing each of the operations described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing program instructions therein, the memory and program instructions being configured to, with the processor, cause the apparatus to at least:

receive a start command;

determine whether one or more predefined conditions are satisfied;

cause an image to be captured, in an instance in which the one or more predefined conditions are satisfied; and in an instance in which the one or more predefined conditions are not satisfied:

identify one or more individuals located within the image, and cause an audible feedback signal to be provided, the feedback signal comprising an indication regarding correction of at least one deficiency which is resulting in the one or more predefined conditions failing to be satisfied and an identification of at least one of the one or more individuals located within the image, the identification comprising a name of at least one of the one or more individuals located within the image;

wherein at least one of the start command or one or more of the predefined conditions is dependent upon an audible signal.

2. The apparatus according to claim 1 wherein determining whether the one or more predefined conditions are satisfied comprises determining whether a reception angle of the audible signal falls within a predefined range of angles.

3. The apparatus according to claim 2 wherein the feedback signal comprises an indication of a relative directional movement which will cause the reception angle of a subsequent audible signal to fall within the predefined range of angles.

4. The apparatus according to claim 1 wherein the memory and program instructions are further configured to, with the processor, cause the apparatus to recognize one or more characters of text, and wherein one or more of the predefined conditions comprise the apparatus recognizing the one or more characters of text.

5. The apparatus according to claim 1 wherein the memory and program instructions are further configured to, with the processor, cause the apparatus to recognize one or more background features, and wherein one or more of the predefined conditions comprise the apparatus recognizing the one or more background features.

6. The apparatus according to claim 1 wherein the memory and program instructions are further configured to, with the processor, cause the apparatus to determine whether a ratio relating a foreground portion to a background portion falls within a predefined range of foreground to background ratios, and wherein one or more of the predefined conditions comprise the ratio relating the foreground portion to the background portion falling within the predefined range of foreground to background ratios.

7. The apparatus according to claim 1 wherein the memory and program instructions are further configured to, with the processor, cause the apparatus to cause a representation of the image to be transmitted to a remote controller, wherein the remote controller is configured to display the representation of the image.

8. The apparatus according to claim 1 wherein the memory and program instructions are further configured to, with the processor, cause the apparatus to identify one or more of the individuals located within the image by:

searching a database for one or more photographic images corresponding to one or more faces of one or more of the individuals located within the image; and determining the name of at least one of the one or more individuals located within the image by determining one or more names corresponding to the one or more photographic images.

9. The apparatus according to claim 1 wherein the memory and program instructions are further configured to, with the processor, cause the apparatus to identify the one or more individuals located within the image by:

searching a database for one or more photographic images corresponding to one or more faces of the one or more individuals located within the image;

determining the name of at least one of the one or more individuals located within the image by determining one or more names corresponding to the one or more photographic images;

determining which of the one or more individuals located within the image should make a change that would correct the at least one deficiency which is resulting in the one or more predefined conditions failing to be satisfied; and wherein the name of at least one of the one or more individuals located within the image comprises one of:
the names of the one or more individuals that should make the change, or
the names of the one or more individuals whose names were determined and a position of the one or more individuals that should make the change relative to the one or more individuals whose names were determined.

10. The apparatus according to claim 1 wherein the memory and program instructions are further configured to, with the processor, cause the apparatus to determine whether one or more recognized visual features in the image are occluded, and wherein the one or more predefined conditions comprise determining that none of the one or more recognized visual features are occluded.

11. A method comprising:
receiving a start command;
determining, with a processor, whether one or more predefined conditions are satisfied;
causing an image to be captured in an instance in which the one or more predefined conditions are satisfied; and
in an instance in which the one or more predefined conditions are not satisfied:
identifying one or more individuals located within the image, and
causing an audible feedback signal to be provided, the feedback signal comprising an indication regarding correction of at least one deficiency which is resulting in the one or more predefined conditions failing to be satisfied and an identification of at least one of the one or more individuals located within the image, the identification comprising a name of at least one of the one or more individuals located within the image;
wherein at least one of the start command or one or more of the predefined conditions is dependent upon an audible signal.

12. The method of claim 11 wherein determining whether the one or more predefined conditions are satisfied comprises determining whether a reception angle of the audible signal falls within a predefined range of angles.

13. The method of claim 12, wherein the feedback signal comprises an indication of a relative directional movement which will cause the reception angle of a subsequent audible signal to fall within the predefined range of angles.

14. The method of claim 11, wherein identifying one or more of the individuals located within the image comprises:
searching a database for one or more photographic images corresponding to one or more faces of one or more of the individuals located within the image; and
determining the name of at least one of the one or more individuals located within the image by determining one or more names corresponding to the one or more photographic images.

15. The method of claim 11, wherein identifying one or more of the individuals located within the image comprises:

searching a database for one or more photographic images corresponding to one or more faces of the one or more individuals located within the image;

determining the name of at least one of the one or more individuals located within the image by determining one or more names corresponding to the one or more photographic images;

determining which of the one or more individuals located within the image should make a change that would correct the at least one deficiency which is resulting in the one or more predefined conditions failing to be satisfied; and wherein the name of at least one of the one or more individuals located within the image comprises one of:
  the names of the one or more individuals that should make the change, or
  the names of the one or more individuals whose names were determined and a position of the one or more individuals that should make the change relative to the one or more individuals whose names were determined.

16. A computer program product comprising at least one non-transitory computer-readable storage medium having computer-executable program instructions stored therein, the computer-executable program instructions being configured to, upon execution, cause an apparatus to:

receive a start command;

determine whether one or more predefined conditions are satisfied;

cause an image to be captured in an instance in which the one or more predefined conditions are satisfied; and in an instance in which the one or more predefined conditions are not satisfied:
  identify one or more individuals located within the image, and
  cause an audible feedback signal to be provided, the feedback signal comprising an indication regarding correction of at least one deficiency which is resulting in the one or more predefined conditions failing to be satisfied and an identification of at least one of the one or more individuals located within the image, the identification comprising a name of at least one of the one or more individuals located within the image;

wherein at least one of the start command or one or more of the predefined conditions is dependent upon an audible signal.

17. The computer program product according to claim 16, wherein determining whether one or more predefined conditions are satisfied comprises determining whether a reception angle of the audible signal falls within a predefined range of angles.

18. The computer program product according to claim 17, wherein the feedback signal comprises an indication of a relative directional movement which will cause the reception angle of a subsequent audible signal to fall within the predefined range of angles.

19. The computer program product according to claim 16, wherein the program instruction are further configured to, upon execution, cause the apparatus to identify one or more of the individuals located within the image by:
  searching a database for one or more photographic images corresponding to one or more faces of one or more of the individuals located within the image; and
  determining the name of at least one of the one or more individuals located within the image by determining one or more names corresponding to the one or more photographic images.

20. The computer program product according to claim 16, wherein the program instructions are further configured to, upon execution, cause the apparatus to identify the one or more individuals located within the image by:
  searching a database for one or more photographic images corresponding to one or more faces of the one or more individuals located within the image;
  determining the name of at least one of the one or more individuals located within the image by determining one or more names corresponding to the one or more photographic images;
  determining which of the one or more individuals located within the image should make a change that would correct the at least one deficiency which is resulting in the one or more predefined conditions failing to be satisfied; and
  wherein the name of at least one of the one or more individuals located within the image comprises one of:
    the names of the one or more individuals that should make the change, or
    the names of one or more of the individuals whose names were determined and a position of the one or more individuals that should make the change relative to one or more of the individuals whose names were determined.

* * * * *